US009769524B2

(12) United States Patent
Gopalan et al.

(10) Patent No.: US 9,769,524 B2
(45) Date of Patent: *Sep. 19, 2017

(54) METHOD AND APPARATUS FOR AUGMENTING MEDIA CONTENT

(71) Applicant: AT&T INTELLECTUAL PROPERTY I, LP, Atlanta, GA (US)

(72) Inventors: Raghuraman Gopalan, Union City, CA (US); Lee Begeja, Gillette, NJ (US); David Crawford Gibbon, Lincroft, NJ (US); Zhu Liu, Marlboro, NJ (US); Amy Ruth Reibman, Chatham, NJ (US); Bernard S. Renger, New Providence, NJ (US); Behzad Shahraray, Holmdel, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/203,336

(22) Filed: Jul. 6, 2016

(65) Prior Publication Data
US 2016/0316265 A1    Oct. 27, 2016

Related U.S. Application Data

(63) Continuation of application No. 14/264,580, filed on Apr. 29, 2014, now Pat. No. 9,451,335.

(51) Int. Cl.
  *H04N 21/231*    (2011.01)
  *H04N 21/233*    (2011.01)
  (Continued)

(52) U.S. Cl.
  CPC ... *H04N 21/44218* (2013.01); *G06K 9/00302* (2013.01); *G06K 9/00711* (2013.01);
  (Continued)

(58) Field of Classification Search
  CPC ........... H04N 21/44218; H04N 21/231; H04N 21/233; H04N 21/23418; H04N 21/2353;
  (Continued)

(56) References Cited

U.S. PATENT DOCUMENTS 7,020,336 B2    3/2006    Cohen-Solal et al.
7,046,851 B2    5/2006    Keaton et al.
(Continued)

FOREIGN PATENT DOCUMENTS

CA    2884714 A1    3/2014

OTHER PUBLICATIONS

Langis, Gagnon et al., "Towards computer-vision software tools to increase production and accessibility of video description for people with vision loss", Universal Access in the Information Society; International Journal, vol. 8, No. 3, Feb. 5, 2009, 199-218.
(Continued)

*Primary Examiner* — Randy Flynn
(74) *Attorney, Agent, or Firm* — Guntin & Gust, PLC; Douglas Schnabel

(57) ABSTRACT

Aspects of the subject disclosure may include, for example, generating narrative descriptions corresponding to visual features, visual events, and interactions there between for media content, where the narrative descriptions are associated with time stamps of the media content, and presenting the media content and an audio reproduction of the narrative descriptions, wherein the audio reproduction is synchronized to video of the media content according to the time stamps. Other embodiments are disclosed.

20 Claims, 7 Drawing Sheets

(51) Int. Cl.
| | |
|---|---|
| H04N 21/234 | (2011.01) |
| H04N 21/235 | (2011.01) |
| H04N 21/242 | (2011.01) |
| H04N 21/442 | (2011.01) |
| H04N 21/439 | (2011.01) |
| H04N 21/44 | (2011.01) |
| H04N 21/45 | (2011.01) |
| H04N 21/458 | (2011.01) |
| H04N 21/466 | (2011.01) |
| H04N 21/4725 | (2011.01) |
| H04N 21/81 | (2011.01) |
| H04N 21/84 | (2011.01) |
| H04N 21/8405 | (2011.01) |
| H04N 21/858 | (2011.01) |
| H04N 21/8547 | (2011.01) |
| G06K 9/00 | (2006.01) |
| H04N 21/454 | (2011.01) |

(52) U.S. Cl.
CPC ....... *G06K 9/00718* (2013.01); *H04N 21/231* (2013.01); *H04N 21/233* (2013.01); *H04N 21/2353* (2013.01); *H04N 21/23418* (2013.01); *H04N 21/242* (2013.01); *H04N 21/4394* (2013.01); *H04N 21/44008* (2013.01); *H04N 21/44016* (2013.01); *H04N 21/454* (2013.01); *H04N 21/458* (2013.01); *H04N 21/4532* (2013.01); *H04N 21/4542* (2013.01); *H04N 21/4667* (2013.01); *H04N 21/4725* (2013.01); *H04N 21/8106* (2013.01); *H04N 21/8133* (2013.01); *H04N 21/84* (2013.01); *H04N 21/8405* (2013.01); *H04N 21/858* (2013.01); *H04N 21/8547* (2013.01)

(58) Field of Classification Search
CPC ............. H04N 21/242; H04N 21/4394; H04N 21/44008; H04N 21/44016; H04N 21/4532; H04N 21/454; H04N 21/4542; H04N 21/458; H04N 21/4667; H04N 21/4725; H04N 21/8106; H04N 21/8133; H04N 21/84; H04N 21/8405; H04N 21/8547; H04N 21/858; G06K 9/00302; G06K 9/00711; G06K 9/00718
See application file for complete search history.

(56) References Cited

U.S. PATENT DOCUMENTS

| | | | |
|---|---|---|---|
| 7,143,352 B2 | 11/2006 | Divakaran et al. | |
| 7,143,434 B1 | 11/2006 | Paek et al. | |
| 7,194,752 B1 | 3/2007 | Kenyon et al. | |
| 7,409,421 B2 | 8/2008 | Sugihara | |
| 7,415,129 B2 | 8/2008 | Rhoads | |
| 7,675,543 B2 | 3/2010 | Jain et al. | |
| 7,773,813 B2 | 8/2010 | Hua et al. | |
| 8,150,233 B2 | 4/2012 | Takao | |
| 8,185,543 B1 | 5/2012 | Choudhry et al. | |
| 8,213,725 B2 | 7/2012 | Loui et al. | |
| 8,358,856 B2 | 1/2013 | Loui et al. | |
| 8,370,869 B2 | 2/2013 | Paek et al. | |
| 8,433,140 B2 | 4/2013 | Ke et al. | |
| 8,564,661 B2 | 10/2013 | Lipton et al. | |
| 8,577,077 B2 | 11/2013 | Zhang | |
| 8,606,782 B2 | 12/2013 | van Beek et al. | |
| 8,630,497 B2 | 1/2014 | Badawy et al. | |
| 2002/0062481 A1 | 5/2002 | Slaney et al. | |
| 2002/0101537 A1 | 8/2002 | Basson et al. | |
| 2003/0221198 A1 | 11/2003 | Sloo et al. | |
| 2007/0214488 A1 | 9/2007 | Nguyen et al. | |
| 2008/0183698 A1* | 7/2008 | Messer | H04N 21/6175 |
| 2009/0015671 A1 | 1/2009 | Addy | |
| 2009/0089827 A1 | 4/2009 | Carlsgaard et al. | |
| 2009/0226046 A1 | 9/2009 | Shteyn | |
| 2010/0109867 A1 | 5/2010 | Williams | |
| 2010/0259676 A1 | 10/2010 | Swan et al. | |
| 2012/0054796 A1 | 3/2012 | Gagnon et al. | |
| 2012/0236201 A1 | 9/2012 | Larsen et al. | |
| 2012/0257111 A1 | 10/2012 | Tanaka et al. | |
| 2013/0083198 A1 | 4/2013 | Maslan | |
| 2013/0089304 A1 | 4/2013 | Jiang et al. | |
| 2013/0120654 A1 | 5/2013 | Kuspa | |
| 2013/0174026 A1 | 7/2013 | Locke et al. | |
| 2013/0177296 A1 | 7/2013 | Geisner et al. | |
| 2013/0290859 A1 | 10/2013 | Venkitaraman et al. | |
| 2014/0002663 A1 | 1/2014 | Garland | |
| 2014/0067825 A1* | 3/2014 | Oztaskent | H04N 21/4782 707/748 |
| 2014/0109134 A1 | 4/2014 | Gauthier et al. | |
| 2014/0123190 A1* | 5/2014 | Song | H04N 21/482 725/40 |
| 2014/0136186 A1 | 5/2014 | Adami et al. | |
| 2014/0150002 A1 | 5/2014 | Hough et al. | |
| 2015/0033266 A1 | 1/2015 | Klappert et al. | |
| 2015/0095938 A1 | 4/2015 | Xiong et al. | |

OTHER PUBLICATIONS

Lavee, Gal et al., "Understanding Video Events: A Survey of Methods for Automatic Interpretation of Semantic Occurrences in Video", Technion—Computer Science Department—Tehnical Report CIS, Apr. 2009, 64 pages.

Shim, Jae-Chang et al., "Automatic Text Extraction From Video for Content-Based Annotation and Retrieval", RC 21087, IBM T.J. Watson Research Center, 1998, 14 pages.

Snoek, Cees G. et al., "Multimodal Video Indexing: A Review of the State-of-the-art", Multimedia Tools and Applications, Springer Science + Business Media, Inc. Manufactured in the Netherlands, 2005, 31 pgs.

Xu, Changsheng et al., "Using Webcast Text for Semantic Event Detection in Broadcast Sports Video", IEEE Transactions on Multimedia, vol. 10, No. 7, Nov. 2008, 1342-1355.

"International Preliminary Report on Patentability & Written Opinion", PCT/US2015/026989, Nov. 10, 2016.

* cited by examiner

200

300

METHOD AND APPARATUS FOR AUGMENTING MEDIA CONTENT

CROSS-REFERENCE TO RELATED APPLICATIONS

This application is a Continuation of and claims priority to U.S. patent application Ser. No. 14/264,580 filed Apr. 29, 2014. The contents of each of the foregoing is/are hereby incorporated by reference into this application as if set forth herein in full.

FIELD OF THE DISCLOSURE

The subject disclosure relates to a method and apparatus for augmenting media content, and, more particularly, for automatically generating narrative descriptions of media content.

BACKGROUND

Media content is typically experienced by consumers via devices such as computers, televisions, radios, and mobile electronics. Media content can be created by many kinds of entities including traditional producers of content, such as professional artists, studios, and broadcasters. Today, the proliferation of video cameras, especially as integrated into mobile communication devices, has resulted in a large amount content generated by consumers of content. Modern communications networks provide interconnectivity between consumers and various communication and storage devices. As network capabilities expand, these interconnections provide new opportunities to enhance the ability for consumers to enjoy media content by experiencing a variety of content over multiple devices.

BRIEF DESCRIPTION OF THE DRAWINGS

Reference will now be made to the accompanying drawings, which are not necessarily drawn to scale, and wherein.

DETAILED DESCRIPTION

Figure 1:
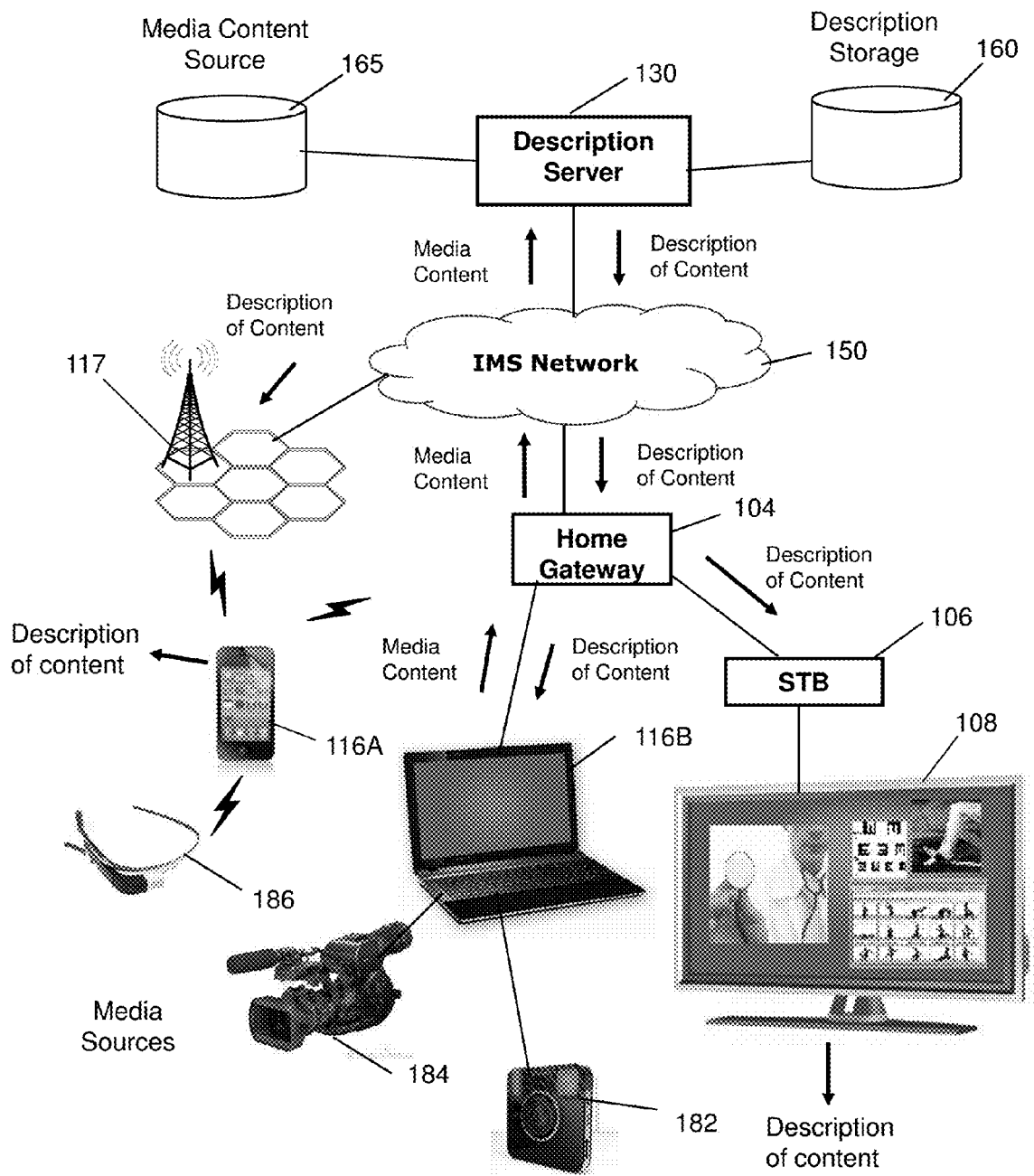
FIG. 1 depicts illustrative embodiments of a system that can be utilized for generating and providing narrative descriptions of media content.

The subject disclosure describes, among other things, illustrative embodiments of augmenting media content with narrative descriptions. Other embodiments are included in the subject disclosure.

The subject disclosure describes, among other things, illustrative embodiments for automatically generating narrative descriptions of media content and for providing filtered versions of these narrative descriptions to end-use applications. Media content, such as video and/or image data, can be scanned to identify visual features. Interactions between the visual features can be analyzed to determine visual events that occur in the content. Narrative descriptions can be generated that correspond to the visual features and events. The narrative description can be synchronized to the original media content. The narrative descriptions can be filtered to provide descriptions specific to an end-use application and/or a user profile. The narrative descriptions can be presented as text and/or audio to fit the needs of the end-use application.

One embodiment of the subject disclosure includes a device comprising a processor and a memory that stores executable instructions that, when executed by the processor, facilitate performance of operations, including scanning a plurality of images from a media content item to detect a plurality of visual features present within the plurality of images. The processor can perform operations including analyzing interactions between the plurality of visual features to determine a plurality of visual events that are depicted in the media content item. The processor can further perform operations including generating a plurality of narrative descriptions corresponding to the plurality of visual features and the plurality of visual events. The plurality of narrative descriptions can be associated with a plurality of time stamps of the media content item. The processor can perform operations including filtering the plurality of narrative descriptions according to requirements of an application to generate a plurality of filtered descriptions. The processor can perform operations including presenting the media content item and the plurality of filtered descriptions via the application.

One embodiment of the subject disclosure includes a machine-readable storage medium, comprising executable instructions. The executable instructions can cause a processor to perform operations including determining a plurality of visual events in first media content according to interactions between a plurality of visual features in the first media content. The executable instructions can further cause the processor to perform operations including generating a first group of narrative descriptions corresponding to the plurality of visual features and the plurality of visual events. The first group of narrative descriptions can be associated with a plurality of time stamps of the first media content. The executable instructions can cause the processor to perform operations including comparing the first group of narrative descriptions to a second group of narrative descriptions associated with second media content to determine a semantic correlation between the first media content and the second media content. The executable instructions can cause the processor to perform operations including generating a recommendation for the first media content according to the semantic correlation and user affinity information associated with the second media content.

One embodiment of the subject disclosure includes a method including generating, by a system comprising a processor, a narrative descriptions corresponding to visual features, visual events, and interactions there between for media content. The narrative descriptions are associated with time stamps in the media content. The method can include presenting, by the system, the media content and an audio reproduction of the narrative descriptions, wherein the audio reproduction is synchronized to video of the media content according to the time stamps.

Figure 2:
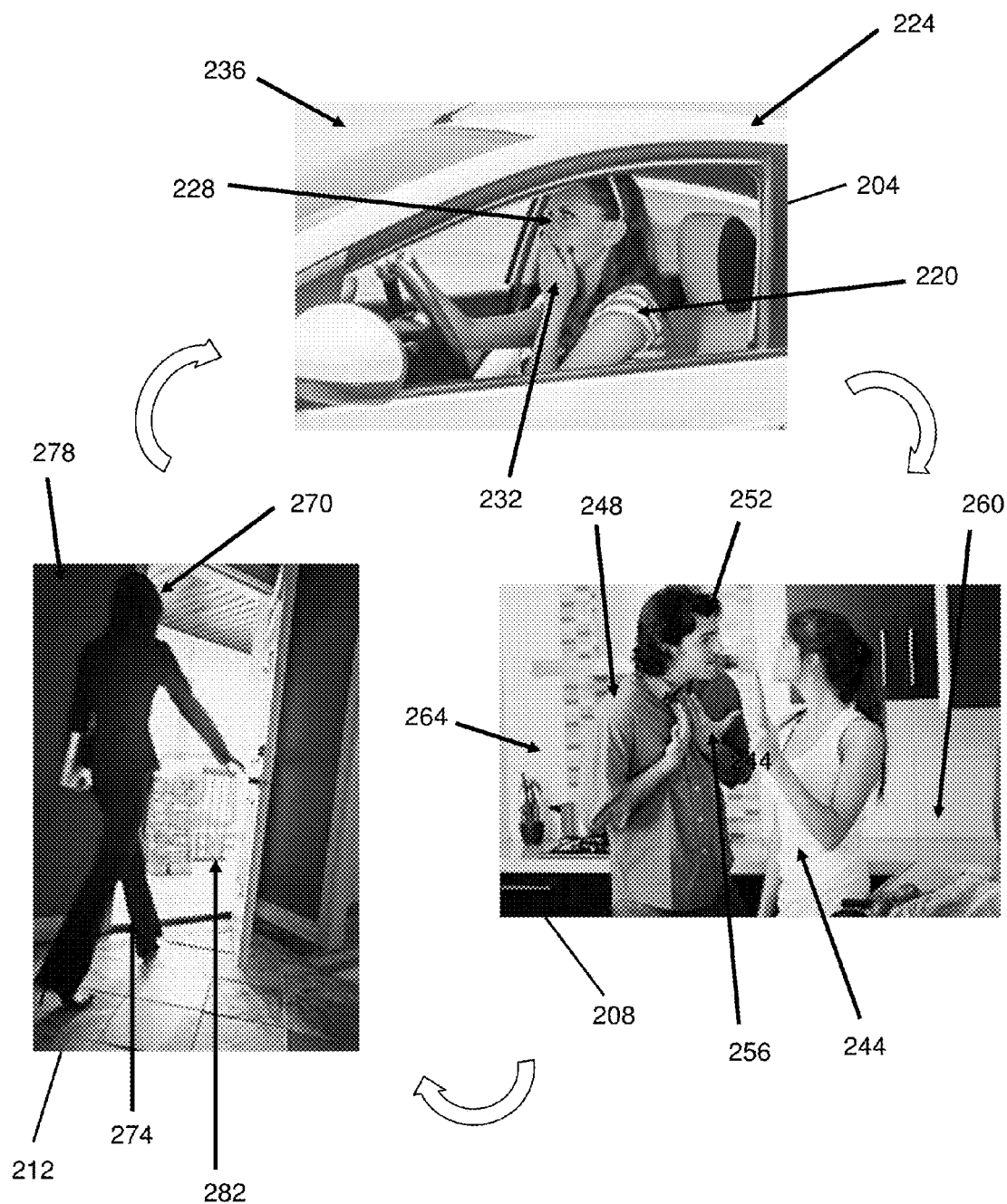
FIG. 2 depicts exemplary images illustrating, in part, media content analyzed in the generation of narrative descriptions according to the system of FIGS. 1, 5, and 6, and the method of FIG. 3.

FIG. 1 depicts an illustrative embodiment of a system 100 that can be utilized for automatically generating narrative descriptions from media content. FIG. 2 depicts exemplary images illustrating, in part, automatically generating narrative descriptions of media content according to the system of FIG. 1.

In one or more embodiments, the system 100 can include a communication network 150. The system 100 can include a subscription telecommunication service, such as an Internet Protocol Multimedia Subsystem (IMS) network 150 for providing cellular/mobile communications, Internet access, and content to mobile communication devices 116A via a mobility network of mobile base stations 117. The system can include a subscription content service, such as an Internet Protocol Television (IPTV) network for providing media content to subscribers. The IPTV network can be part of a cable, satellite, or DSL-based media content delivery system. The media content can be any type of viewable content, such as broadcast television, cable or premium television, video on demand, or pay-per-view television. The IPTV network can deliver media content to media processing devices 106 and media display devices 108 at subscriber locations via gateway devices 104. In one or more embodiments, the system 100 can include wireless computer devices 116B that are connected to the communication network 150. For example, a wireless computer device 116B can be coupled to the communication network 150 via a gateway device 104.

In one or more embodiments, the system 100 can include one or more description servers 130 that are associated with the IMS network 150. In one embodiment, a description server 130 can communicate with media content sources 116A, 182, 184, and 186 and/or media content sources 165 over the IMS network 150. The description server 130 can communicate with a description storage device 160. For example, the image storage device 160 can be cloud-based storage, dedicated server storage, or networked storage devices, even local storage devices that are linked to the network 150 via software. The description server 130 can further communicate with media processor devices 106 and media display devices 108 over the IMS network 150. The mobile communication device 116 can communicate with the IMS network 150 using one or more components of a mobility network 117, such as cellular base stations for receiving and transmitting wireless communication signals.

In one or more embodiments, a media processor device 106 can communicate with a description server 130 via the IMS Network 150 by way of a gateway device 104. The media processor device 106 can receive user inputs from a remote control device for performing functions, such as powering ON/OFF, selecting channels for viewing media programs, adjusting volume, and/or programming a digital video recorder. The media processor device 106 can receive a user input for selecting a media program and/or a channel for receiving a media program. In one example, the media processor device 106 can present an electronic programming guide at a media device 108 for assisting in the selection of media programming. In one or more embodiments, the media processor device 106 can receive cluster group images from the description server 130 so that a viewer of the media device 108 can easily review media content and narrative description information.

In one or more embodiments, the description server 130 can receive media content items from one or more media content sources. For example, media content can be uploaded from end-user sources 182, 184, 186, 116A, and 116B. Uploading events can be locally directed at end-user sources 182, 184, 186, 116A, and 116B, or can be directed by the description server 130 or by another network device. In another example, media content items can be received from one or more media sources 165, such as sources of broadcast programming or video-on-demand (VOD) programming. For example, a copy of all or part of a broadcast or VOD program can be received at the description server 130. In another embodiment, media content, such as video, audio, and/or still images can be received from a social networking system or site. In one embodiment, media content items and corresponding narrative description data can be stored at a description storage device 160. The description storage device 160 can store the media content items and the narrative description data as cloud accessible content. The narrative description data can be generated by the description server 130 or can be received along with media content from a media content source 165. Many types of end-user devices 182, 184, 186, 116A, 116B can include media and/or video capturing technology. Other examples, not shown, include ubiquitous or environmental cameras, such as cameras placed in homes, businesses, vehicles, and so forth.

The description server 130 can analyze media content to generate narrative descriptions of the content. In one embodiment, the media content can be broken down into a set of captured still images, or screen captures. For example, the media content can be divided into a series of images 204, 208, and 212, as shown in FIG. 2. In one or more embodiments, the description server 130 can analyze images from the media content to generate narrative descriptions. The series of images 204-212 can originate from media content of a user device, such as a mobile communication device 116A, or from a media content source 165 of the system 100 of the provider network. In one embodiment, the series of images 204-212 from the media content can be stored separately from the media content for further analysis and/or display. For example, the media content and/or the series of images 204-212, and/or the generated narrative description can be stored at the description storage, which can be a cloud-based resource. In one embodiment, the description server 130 can divide the media content into images. In another embodiment, image division can be performed at a different device, such as at a user device 116B or can be provided to the description server 130 by a service provider resource, such as the media content source 165.

In one or more embodiments, the description server 130 can analyze image or video from media content to automatically generate a narrative description of the content. The description server 130 can perform image analysis via digital imaging techniques. The image analysis can include analyzing the images for the presence of edges, or boundaries of features. In one embodiment, edge detection, filtering, and smoothing can be performed to thereby detect and define feature boundaries and/or silhouettes in the visual images. Once feature boundaries are detected in images, then the description server 130 can attempt to match these two-dimensional features to known three-dimensional objects via shape analysis. For example, the various known three-dimensional objects can be described according to generic three-dimensional appearance models and/or solid geometry, which can be interpreted and projected onto two-dimension space. The two-dimensional features that are detected in the images can be matched against a database of projected two-dimensional representations of known three-dimensional objects. In this way, the description server 130 can detect the presence and orientation of known objects in the images. For example, a partial shape of an automobile 224, a doorway 282, or even human beings 244 and 270 can be detected in images.

In one or more embodiments, the description server 130 can be populated with metadata or other derived information from personal content of a subscriber. For example, the metadata can comprise images and textual descriptions of the subscriber's friends, family, home, and so on, that can be collected from social media sites and/or a subscriber's collection of images. The metadata information can also be created by leveraging information from the Internet by, for example, scanning a website or a collection of images and associated text via a search engine.

In one or more embodiments, the object recognition can be used to detect, catalog, and synthesize complex objects and scene within an image. For example, the description server 130 can determine that an image includes a series of rectangular objects and that these objects are consistent with known three-dimensional models of kitchen cabinets. Further, the description server 130 can determine that other objects in the image are consistent with three-dimensional models of human beings. The presence of these detected objects can be recognized as consistent with a two-dimensional representation of a scene within a kitchen as depicted in an image 208. Thus, the description server 130 can catalog the presence of two people in a kitchen as a matter of the digital image analysis. Further, the description server 130 can generate a narrative description of the images as a scene in which two people are present in a kitchen.

In one or more embodiments, the description server 130 can further process the detected objects against additional recognition algorithms and pattern recognition. For example, a facial recognition algorithm can be used to detect the presence of human faces within the images and to compare these human faces to databases of known faces. The database of known faces can include the faces of famous persons, such as celebrities, actors, and/or other "known" people. The database can further include the faces of people that are known to a user of the system 100, such as family or friends from a social network or a digital photo book. The description server 130 can use such a database of known faces to determine if any of the detected faces in images match faces to which known identities are attached. In one embodiment, where the media content that is being analyzed is known to be a commercially produced movie or television show, then this media content item can further be associated with descriptive data, such as metadata or data from an online database. This additional descriptive data can include, for example, a roster of actors, who participated in the media content. The description server 130 can utilize this information to assign and coordinate detected instances of faces of known actors with the characters that they are portraying in the media content piece. So, for example, the people present in the kitchen scene at an image 208 can be determined to be Actor X and Actress Y, who further correspond to Character A and Character B from television show C. The description server 130 can use this information to improve its narrative description of the scene by adding the character names to the description. In one embodiment, the description server 130 can include the actors' real names as well, either in the narrative description or in additional reference material that can be included along with the narrative description.

In one or more embodiments, the description server 130 can further analyze the detected features and objects in the images to identify additional objects and/or to determine various additional information, such as the presence of animate and inanimate object, distances and orientations between detected objects, locations of scenes, repetitions of objects from earlier images, the appearance of new objects and/or the disappearance of previously detected objects, and/or changes in appearance, orientation, or condition of objects. The description server 130 can convert this detected information into contextual information that is added to the narrative. So, for example, the description server 130 can include descriptions of a man near a woman, an automobile stopping, a woman facing out an open door, a woman sitting in a mall parking lot, a woman carrying a purse, or a man in a light color shirt.

In one or more embodiments, the description server 130 can compare detected objects, people, and orientations in one image with those in other images. For example, the characteristics of identified objects, persons, and scenery in a first image from a media content item can be compared to a subsequent image in the content item. The description server 130 can determine what has changed between the two images. For example, in a first image a man and a woman can be standing near one another in a kitchen. In a subsequent image, the woman can be moving toward or away from the man. In one embodiment, the description server 130 can detect frame of reference or point of view information. For example, in one image two people are present followed by images where only one is present. The description server 130 can identify common cinematography elements, such as switching to close-ups of single actors during scenes, such as conversations, so that the description server 130 can recognize and filter out these cinematographic elements from actual movements of persons within and between images.

In one or more embodiments, the description server 130 can analyze animate objects, such as people identified to the image, for indicia of emotional content. For example, the facial expressions of persons can be compared to facial databases and/or facial models to determine facial expressions. Similarly, faces of animals can be analyzed to detect expressions. Emotional states of anger, happiness, sadness, fear, and the like, can be determined from facial expressions. In another embodiment, physical posture, poses, and/or gestures can be analyzed against database and/or three-dimensional models to distinguish emotional states and/or to confirm emotional states determined from facial expressions. In one or more embodiments, detected facial expressions and/or physical poses can be analyzed over more than one image to detect, confirm, and/or refine changes in determined emotional states of animate objects (people, animals) in images.

In one or more embodiments, the description server 130 can analyze lighting conditions within images to determine image mood. For example, a brightly lit scene may indicate one type of mood, while a darkly lit scene may indicate a different mood. In one embodiment, element of lighting, such as intensity, color, filtering, back lighting, facial lighting, and/or shadowing can be compared to a database of known cinematographic techniques to determine a likely mood for the image. Where the media content includes information that allows the director or cinematographer to be determined, the database can further be narrowed to included known techniques of these artists.

In one or more embodiments, the description server 130 can analyze music and sound effects present in the media content at the image or at a segment of connected images. Music recognition analysis can be performed to identify the music to a known composition, artist, and/or performance. Where the media content includes information describing musical selections, composers, and/or artists appearing in the content, then the musical selection can be more easily identified when compared against music that was known to be present in the content. By detecting and identifying the music present in the content, the description server 130 can determine a likely mood or emotion that the director/musical director was attempting to convey. If the media content includes video of an artist, band, and/or orchestra performing the music, then the description server 130 can detect the performance and can provide narrative descriptions describing aspects of the performance. If the music is used as background to dramatic performance in the images, then the description server can note this use of music and can further draw conclusions as to mood and/or direction of a scene or segment of the content based on the music. For example, the music can transform a mundane scene 204 in which a woman is sitting in a car into one of happiness, sadness, fear, anger, and/or loneliness and loss. The description server 130 can provide information on such moods within the scope of the narrative description.

In one or more embodiments, the description server 130 can detect and analyze dialog and narration in segments of images. The description server 130 can perform audio to text conversion of the dialog to generate a transcript of the dialog. In one embodiment, the dialog can be added to the narrative description in a form similar to that found in a novel or short story. For example, the narrative can relate that "Joe said to Ann, 'I need to talk to you.'" In another embodiment, the narrative description can summarize the dialog rather than reciting quotations. In another embodiment, the description sever 130 can use transcriptions of dialog as a reference for comparing, confirming, and/or refining its conversion of image data into a story. For example, the description server 130 may conclude that a woman left a house in anger at one image by analyzing the content of a transcription of dialog associated with a conversation between the woman and a man in a kitchen.

In one or more embodiments, the description server 130 can analyze the image data for potentially objectionable content, such as nudity, violence, and/or sexual situations. The description server can detect these elements by comparing objects and features against a database of objects. In one embodiment, audio content can be compared against known sound effects, such as gunfire, battle effects, explosions, or audio associated with sexual content. In one embodiment, the description server 130 can provide a narrative description of the content. In another embodiment, the description server 130 can be configured to provide a sanitized description of the content or can simply label the content as "adult" or "violent" or "sexual." In embodiment, the description server 130 can access online databases that provide parental advisories for content. The derived content narrative can be compared to an online content advisory for confirmation and/or can automatically submit an amendment or addition to the online advisory. In one or more embodiments, the description server 130 can label a time stamped section of a media content item as "restricted" or "subject to content advisory." This label can further be used during access or playback of the media content to enable editing or annotating of the content.

In one or more embodiments, the description server 130 can recognize one or more objects in an image as representative of a location or a time period. For example, an image of a building or a statue can be compared to a database of famous architectural objects to determine that the object, and therefore the scene, is located in Paris, France. In another example, the clothing, hair styles, and/or conveyances can be compared to a database to determine a time period for a scene.

In one or more embodiments, the description server 130 can associate timestamp information with objects or features that are extracted from the images and audio of the media content. Since scenes within a media content item are chronologically related in the sense that images 204 from a first scene proceed images 208 from a second scene, which, in turn, proceed images 212 from a third scene. Therefore, the relationship between objects and features in the first, second, and third scenes creates a series of events that are associated with timestamps, where the events are part of greater narrative story that links the events from image to image and scene to scene. The description server 130 can describe each of these events at the image level in a narrative form that is linked to one or more timestamps of one or more images 204. For example, the description server 130 can analyze the media content at a first image 204 to determine that a woman, identified as a character named Amanda, is being played by actress Samantha 228. Amanda is wearing a blue striped shirt 220 while sitting in a white Buick™ sedan 224 in a parking lot of an apartment building during the daylight hours 236. She is surprised 232 by something serious as indicated by her captured expression and by the background music. The description server 130 can generate a narration of the event captured by this image 204 and associate this description with a timestamp of the location of the image 204 within the media content. In another embodiment, a set of other nearby images can be collected into a scene, where the scene can be associated with one or more timestamps to identify a beginning and end of the scene. For example a collection of a few more images before and after the first image 204 show an image of what Amanda has seen that has surprised her.

In one or more embodiments, the description server 130 can analyze images 204-212 and scenes for all or part of the entire media program. Each scene can capture an event in the overall story. For example, the description server 130 can determine that a later image 208 depicts a male character 248 named Jason, played by an unknown actor, and a female character 244 named Lisa, played by an actress named Dakota. In this scene the facial expressions 252 and gestures 256 and dialog of Jason and Lisa indicate that they are arguing in an elegant kitchen 260 and 264. In a still later image 212, a figure of a woman 270 is shown walking 274 out of a doorway from darkness 278 to light 282. Each of the events of associated with the images 204-212, and the scenes that these events represent, can be described in narrative form by the description server 130.

In one or more embodiments, the description server 130 can further describe a sequence of events represented by the analyzed images 204-212. The sequence of events and their respective timing within the overall media program create additional contextual information that the description server 130 can use to piece together an overall narrative story for all or part of the media content. For example, the descriptive server 130 can determine from the combining of the events detected in the various images 204-212 that Amanda is surprised to see Jason, who is married to Amanda's best friend Lisa, is buying illegal drugs. Lisa confronts Jason but to no avail. Later, Amanda leaves her life of darkness with Jason to start over in a new and hopeful way. In one or more embodiments, the description server 130 can combine narratives based on visual and audio observations for each image and scene into an overall narrative for the entire story. The description sever 130 can store the narrative description at a description storage device 160.

In one or more embodiments, the entire narrative description can include textual descriptions that are associated with timestamps that specify locations within the media content. The narrative description can be a speech or textual description of the visual content. In one or more embodiments, the description server 130 can annotate the content on one or more semantic levels.

In one or more embodiments, the description server 130 can translate the captured objects, features, and events into comprehendible speech and textual descriptions, or narrative descriptions. As the underlying meaning and interpretation of the objects is known to the description server 130 in a machine-based language, the textual and narrative descriptions may be generated in any language known to the description server 130. For example, if the content for a British television series was analyzed by the description server 130, the descriptions generated could be in Spanish, French, and/or simulated American Sign Language. With an elementary representation known by the description server 130, systems created using prior knowledge in the art of machine translation could be applied to further translate the textual and narrative descriptions to other known languages In one or more embodiments, learning strategies can be trained on related tasks to introduce new characteristics to the description server 130. For example, a segment of video content can be evaluated by experts, who can generate narrative descriptions to describe the video content. A set of prior labeled instances of objects, features, and events in the video content can be used, along with the expert narratives, to train a model for automatically generating narrative descriptions from detected objects, features, and events. A description server 130 can be populated with manually created metadata over a person's personal content collection—labeling that person's friends, family, home, etc. with textual information. In a similar embodiment, the description server 130 can be populated by leveraging information on the Internet—analyzing a website or collection of images from a search engine and its associated page text. In one or more embodiments, the description server 130 can learn mappings across heterogeneous media representations (i.e., the content and its respective metadata labels) and latent space methodologies to provide a framework for the process. Examples of latent space methodologies known to those skilled in the art may include generative Bayesian models, Markov Random Fields (MRFs), Sparse Coding (SC), discriminative Support Vector Machines (SVMs), Deep Neural Networks (DNNs), and Manifold Learning.

In one or more embodiments, the generated narrative description can be used to provide new features and to enhance user experiences at secondary devices. For example, the generated narrative description can be provided to an end-user device, such as a mobile communications device 116A, a computing device 116B, or a media processor device 106. The narrative description can be supplied as text, searchable text, and/or audio. In one embodiment, the narrative description can be supplied to end-user devices along with media content to act as a supplement to the media content. For example, a communication system 100 can send media content to a media consumption device, such as a media processor 106. The media processor 106 can reproduce the media content at a media display device 108. At the same time, the communication system 100, through, for example, the description server 130 can send the narrative description information to a companion end-user device, such as a computing device 116B. During presentation of the media content via the media processor device 106, the companion device 116B can present the narrative description as a supplement to the media content. In various embodiments, the companion device 116B can reproduce the narrative description in text format, as audio, and/or as a searchable database.

In one or more embodiments, the narrative description can include hyperlinks that can be displayed on the screen on the companion device. The hyperlinks can direct end-users to Internet-accessible information linked to the narrative description—specific actors, objects, features, storyline. The hyperlinks can be synchronized to the media content via time stamp linkage between the narrative description and the media content. In one or more embodiments, the narrative description can provide a high-level textual summarization of a movie for use in a search engine.

In one or more embodiments, a narrative description can be provided for low-vision or impaired vision users of media content. For example, a vision-impaired viewer may be able to generally watch a presentation of media content but may have difficulty discerning details such as mood or expression or may miss some plot details. The narrative description can be provided to the viewer to fill in gaps in understanding. The narrative description can be provided through the same device that is presenting the media content. For example, a version of the narrative description can be presented on-screen as text, as with closed-captioning, with perhaps larger text sizes to accommodate impaired vision. In another example, the narrative description can be made available in an audio form. The viewer could listen to an audio version of the narrative text while watching the video of the media content. Alternatively, a viewer may decide to listen to both the audio of the narrative description and audio of the media content at the same time. In another example, the viewer can turn the audio version of the narrative description OFF and ON or can listen to all or part of the audio narrative before viewing the media content (to preview the content) or after viewing the media content (to summarize and clarify the content).

In one or more embodiments, an application for presenting the narrative description to a vision-impaired user can allow a user to customize the presentation or access to the narrative information. In one embodiment, an application can filter the narrative description for specific types of information that will be presented to the viewer while other information is filtered out. For example, if the vision-impaired viewer has sufficient vision capability to generally follow scenery and movements of people or objects to understand these aspects of the media program, then the application can selectively exclude this information from the narrative description that is provided to the viewer. Such a viewer might only need more nuanced information, such as expressions or moods. Therefore, the viewing application can be configured to provide only the information that is needed. Customization of the configuration can be executed using view profiles and/or settings recommended according to information supplied by the viewer.

In one or more embodiments, an application can present the narrative description information for educational purposes. For example, the narrative description can include information that can be detected via an image-by-image analysis but would be easily missed or simply not obvious while viewing the media content. For example, the narrative description can include descriptions of colors or backgrounds or characters that only appear momentarily. In another embodiment, the narrative description can include annotative information that is triggered by features detected in the images. For example, a scene can appear near a famous building or an actor can wear a particular costume or a historic article of clothing. In these cases, the narrative description can annotate the description with information describing the building or the costume. Alternatively, a hyperlink can be presented to the viewer. In either case, these techniques can be extended to present annotative information for commercially available products or services.

In one or more embodiments, narrative information can be used to provide an automated annotation of visual media. In one embodiment, the narrative description can serve as a basis for a searchable database of information describing the media content. For example, a viewer can be provided with the ability to submit, via text or speech, plain-text queries for searching the narrative description. A viewer can say, "Find the scene before Bernie drives away in a car." A narrative search engine can search the narrative description according to the query, or according to one or more keywords from this query. The narrative search engine can return one or more results that can provide the narrative description and that can provide time stamps for matching locations in the media content. The narrative search engine can save substantial viewer time by helping the viewer to locate sections and subject matter of interest in the media content without wasting time previewing sections of content that are not really of interest. Alternatively, the search function can allow the viewer to quickly confirm that particular media content item does not include subject matter of interest. System and network resources can be saved as the viewer decides to forego attempts to download or view the content. In one or more embodiments, applications and/or viewer profiles can search for specific subject matter according to application setup and/or viewer profile. For example, an NBA fan application can pre-filter game action content by pre-searching the narrative description for highlight plays, such as slam dunks. The viewer can thus be presented with only the sections of the media content (dunks occurring during the televised game) that are of interest.

In one or more embodiments, narrative information can be used to generate media content recommendations. A narrative description can be generated automatically for a new item of media content. The narrative description can be subjected to searching and filtering according to a database of previously-viewed media content and/or a profile of viewer preferences. If, for example, past viewership indicates that the viewer is keenly interested in murder mysteries set in historical time-periods but only if the setting and mood is upbeat, then the narrative description can be searched using keywords and phrases designed to detect and distinguish media content against this template. In addition to searching for plot elements, the application can detect mood and emotion elements that are not likely to be available unless a reviewer of the work has studied it carefully and written comprehensively. The image-by-image nature of the narrative analysis, coupled with the ability to make the narrative very comprehensive, facilitates the creation of a comprehensive narrative description that is amenable to comprehensive and "picky" searches. In one or more embodiments, the narrative generation process can be performed on media content that is known to appeal to a viewer. The narrative description of the known "good" content can then be compared to the narrative description of a new work of media content to predict viewer acceptance according to the degree to which the works correlate or do not correlate.

In one or more embodiments, a narrative description can be used for content filtering. If the media content includes potentially offensive content (nudity, violence, foul language), then the narrative description can include descriptions (or euphemisms) that flag instances of the offensive content. In one embodiment, the narrative description can be searched using keywords or phrases or flags that can detect instances of the offensive content. In one example, an application that uses the narrative description can be configured to exclude sections of the media content that include offensive content. Alternatively, the application can simply prohibit viewing of the media content based on the presence of offensive content or based on the presence of specific offensive content or based on a number of instances of such content. For example, the application could be configured to allow viewing of the media content if it only contains X instances or if the instances are only bad language but not nudity. The application can be configured according to a viewer profile. In the case of an application that is used to prevent children from viewing, then the application can further include password protection or can be tied to the parental control password protection that is provided in media processor devices 206 and/or media display devices 208. In another embodiment, the application can be used to locate offense content for the purpose of viewing it without watching the rest of the media content.

Figure 3:
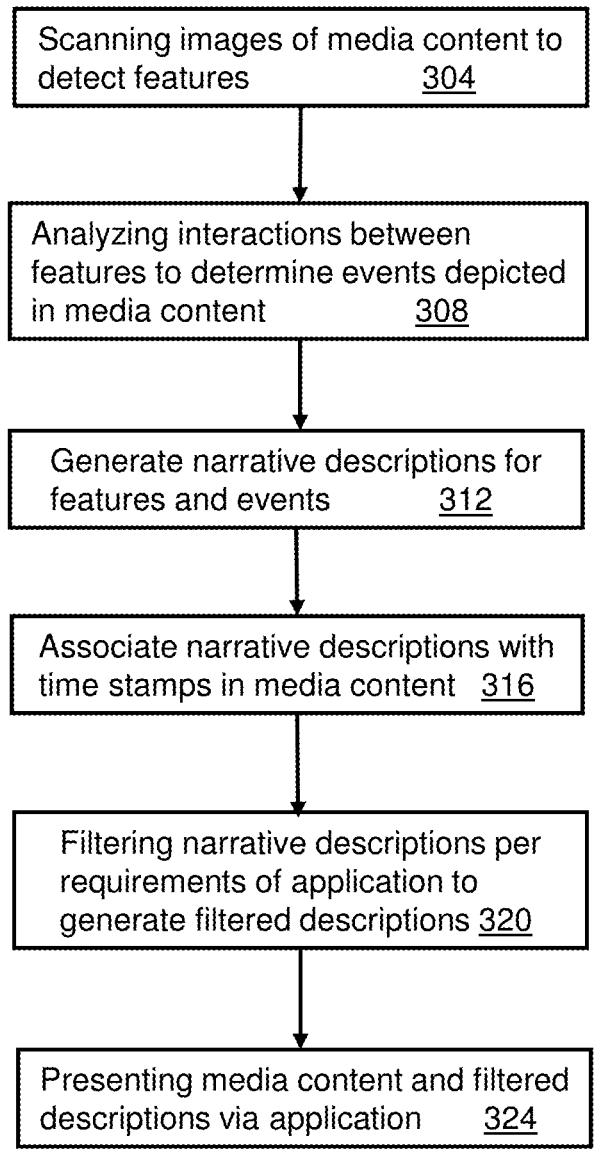
FIG. 3 depicts an illustrative embodiment of a method operating in portions of the system described in FIGS. 1, 5, and 6.
Figure 4:
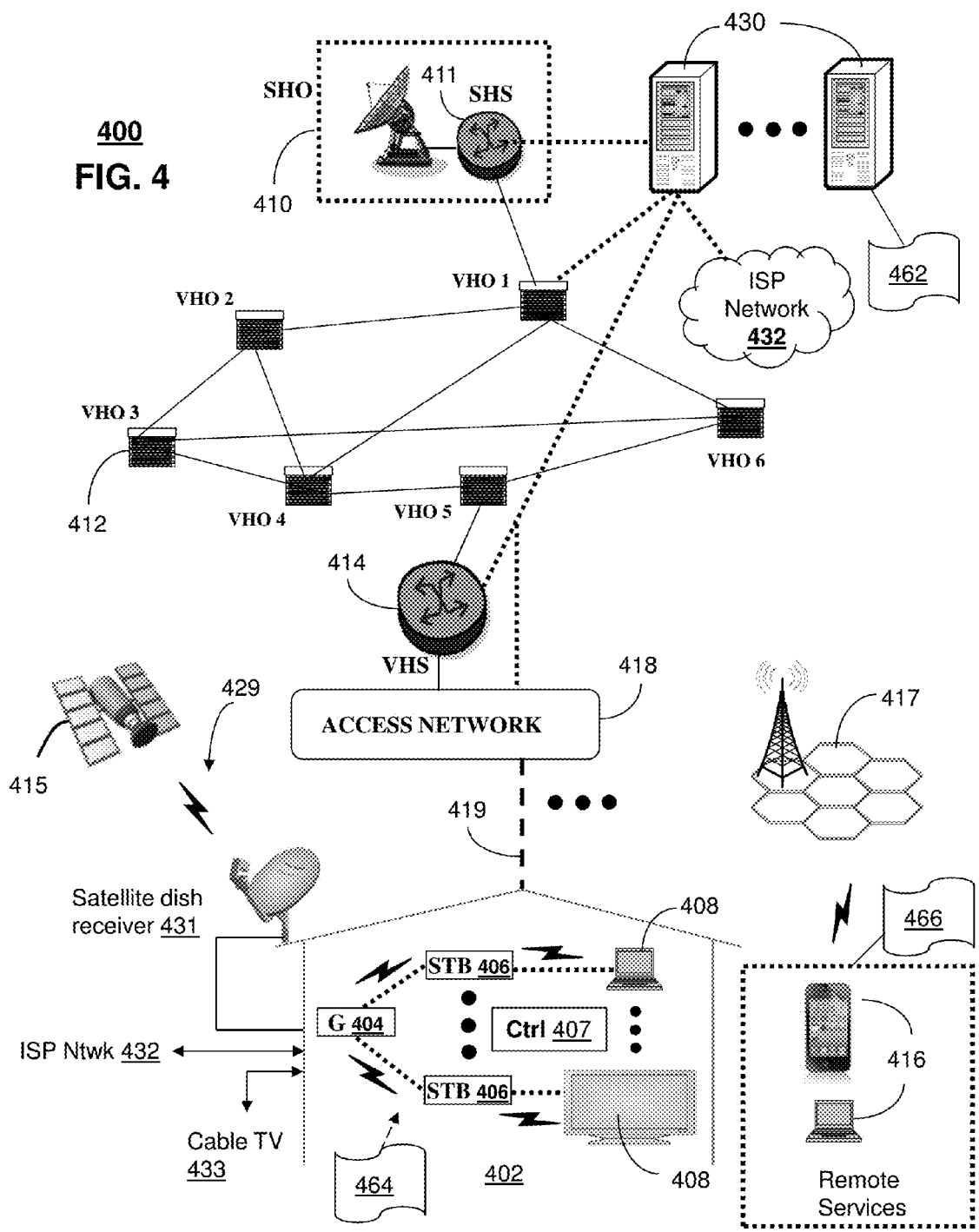
FIGS. 4 and 5 depict illustrative embodiments of communication systems for automatically generating narrative descriptions of media content according to embodiments illustrated in FIGS. 1, 4, and 5.
Figure 5:
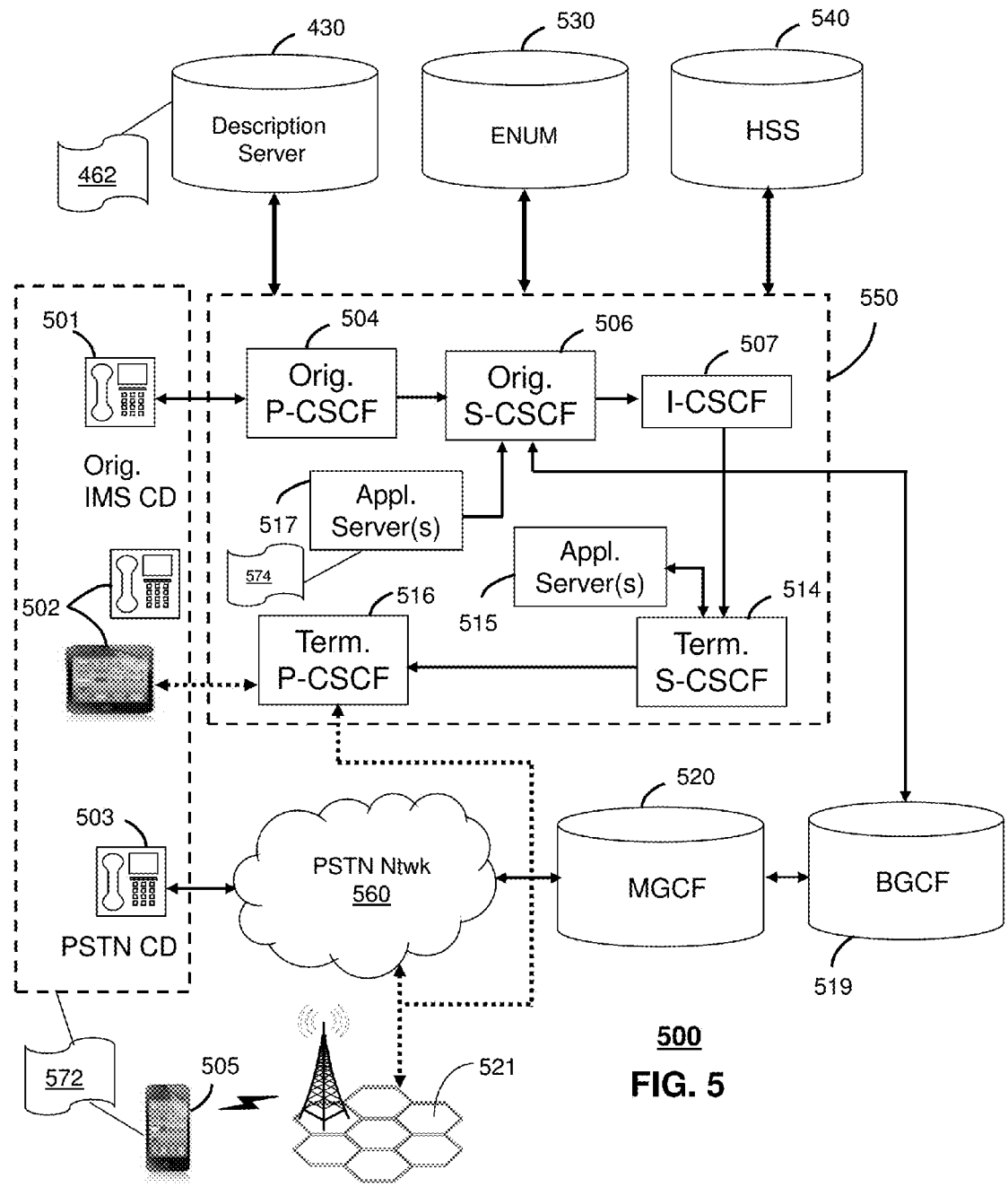

FIG. 3 depicts an illustrative embodiment of a method operating in or using portions of the system described in FIGS. 1, 4, and 5. Method 300 can begin with step 304, in which images of media content are scanned to detect features. In one embodiment, a description server 130 can perform image analysis via digital imaging techniques to detect edges or boundaries of features. Once feature boundaries are detected in images, then the description server 130 can compare two-dimensional features to known three-dimensional objects via shape analysis via a database of projected two-dimensional representations for known three-dimensional objects. In other embodiments, the description server 130 can detect complex objects, people, faces, animals, actors, and relationships between these features.

At step 308, the interactions between features are analyzed to determine events depicted in the media content. In one or more embodiments, the description server 130 can compare detected objects, people, and orientations in one image with those in other images. The description server 130 can identify cinematography elements and filter out these elements from actual movements of features within and between images. The description server 130 can analyze animate objects, such as people identified to the image, for indicia of emotional content. Detected facial expressions and/or physical poses can be analyzed to detect, confirm, and/or refine changes in determined emotional states of animate objects (people, animals) in images. The description server 130 can analyze lighting conditions and music and sound effects within images and scenes to determine mood and context. The description server 130 can provide information on moods within the scope of the narrative description. The description server 130 can detect and analyze dialog and narration in segments of images to generate a transcript of the dialog that can be added to the narrative description or can be used for confirming the narrative description.

At step 312, the description server 130 can generate a narrative description for the detected features and events. In one or more embodiments, a learning-based model can be used to automatically generate narrative descriptions from the detected information. At step 316, the description server 130 can associate the narrative descriptions with time stamps in the media content. In one or more embodiments, the description server 130 can associate timestamp information with objects or features that are extracted from the images and audio of the media content such that relationships between objects and features in images and scenes create a series of events that are associated with timestamps, where the events are part of greater narrative story that links the events from image to image and scene to scene. The description server 130 can describe each of these events at the image level in a narrative form that is linked to one or more timestamps of one or more images 204.

At step 320, the narrative descriptions can be filtered according to requirements of an application to generate filtered descriptions. In one or more embodiments, the generated narrative description can be used to provide new features and to enhance user experiences at secondary devices. During presentation of the media content via one device, a companion device can present the narrative description as a supplement to the media content.

At step 324, the media content and filtered descriptions can be presented via an application. In one or more embodiments, a narrative description can be provided for low-vision or impaired vision users of media content. In one or more embodiments, an application can present the narrative description information for educational purposes. In one embodiment, the narrative description can serve as a basis for a searchable database of information describing the media content.

FIG. 4 depicts an illustrative embodiment of a first communication system 400 for delivering media content. The communication system 400 can represent an Internet Protocol Television (IPTV) media system. Communication system 400 can be overlaid or operably coupled with the system of FIG. 1 as another representative embodiment of communication system 400. Description server 130 can be utilized for automatically generating narrative descriptions of media content and providing filtered versions of the narrative descriptions for use in applications.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a description server 430. The description server 430 can use computing and communication technology to perform function 462, which can include, among other things, generating narrative descriptions of media content from any of several sources, including broadcast sources 410 and end-user devices 416. The media processors 406 and wireless communication devices 416 can be provisioned with software functions 464 and 466, respectively, to utilize the services of description server 430.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

FIG. 5 depicts an illustrative embodiment of a communication system 500 employing IP Multimedia Subsystem (IMS) network architecture to facilitate the combined services of circuit-switched and packet-switched systems. Communication system 500 can be overlaid or operably coupled with system 100 of FIG. 1 and communication system 400 as another representative embodiment of communication system 400. The system 500 can include a description server 430 for generating narrative descriptions of features, objects, and events in media content. The media content can be supplied from network sources, including broadcast media sources and communication devices 502. The description server 430 can provide the filtered versions of the narrative descriptions to communication devices 505 in the system via communications in the IMS network 550.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The description server 430 of FIG. 4 can be operably coupled to communication system 500 for purposes similar to those described above. Description server 430 can perform function 462 and thereby provide narrative description services to the CDs 501, 502, 503 and 505 of FIG. 5. CDs 501, 502, 503 and 505, which can be adapted with software to perform function 572 to utilize the services of the description server 430. Description server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
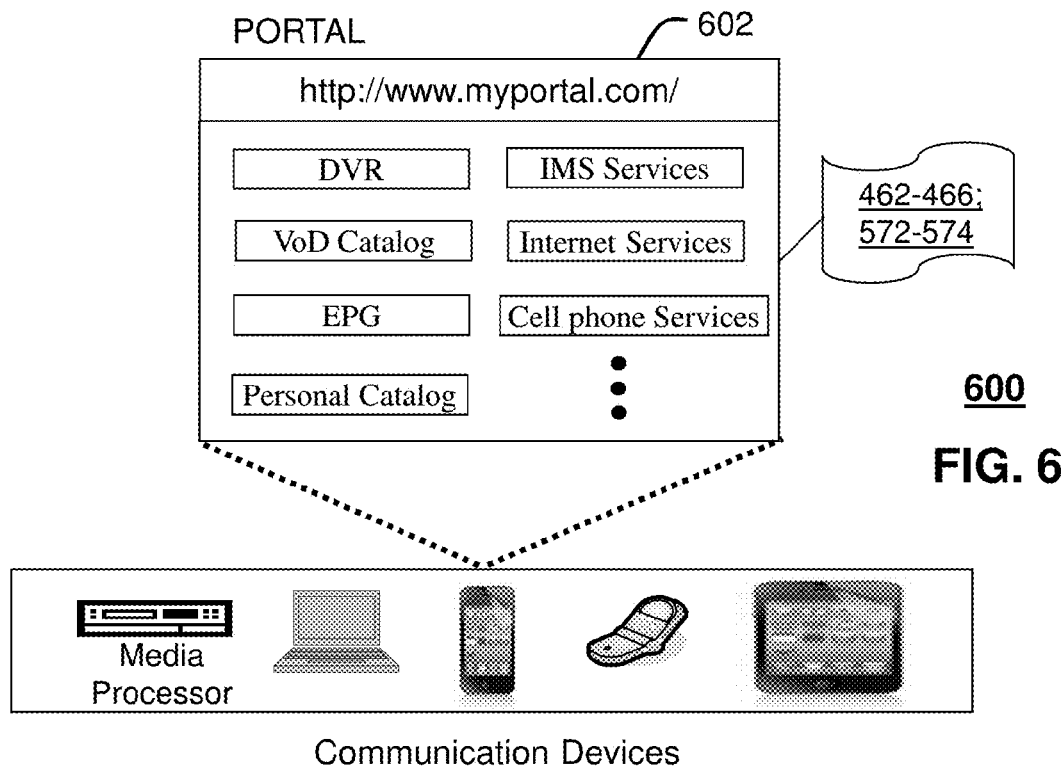
FIG. 6 depicts an illustrative embodiment of a web portal for configuring a server for generating and providing narrative descriptions of media content according to the communication systems of FIGS. 1, 5, and 6.

FIG. 6 depicts an illustrative embodiment of a web portal 602 which can be hosted by server applications operating from the description server 430 of the communication system 100 illustrated in FIG. 1. Communication system 600 can be communicatively coupled to system 100 of FIG. 1, communication system 400, and/or communication system 500. The web portal 602 can be used for managing services of system 100 of FIG. 1 and communication systems 400-500. A web page of the web portal 602 can be accessed by a Uniform Resource Locator (URL) with an Internet browser using an Internet-capable communication device such as those described in FIGS. 1, and 4-5. The web portal 602 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of communications systems 100 of FIG. 1, and 400-500 of FIGS. 4-5.

Figure 7:
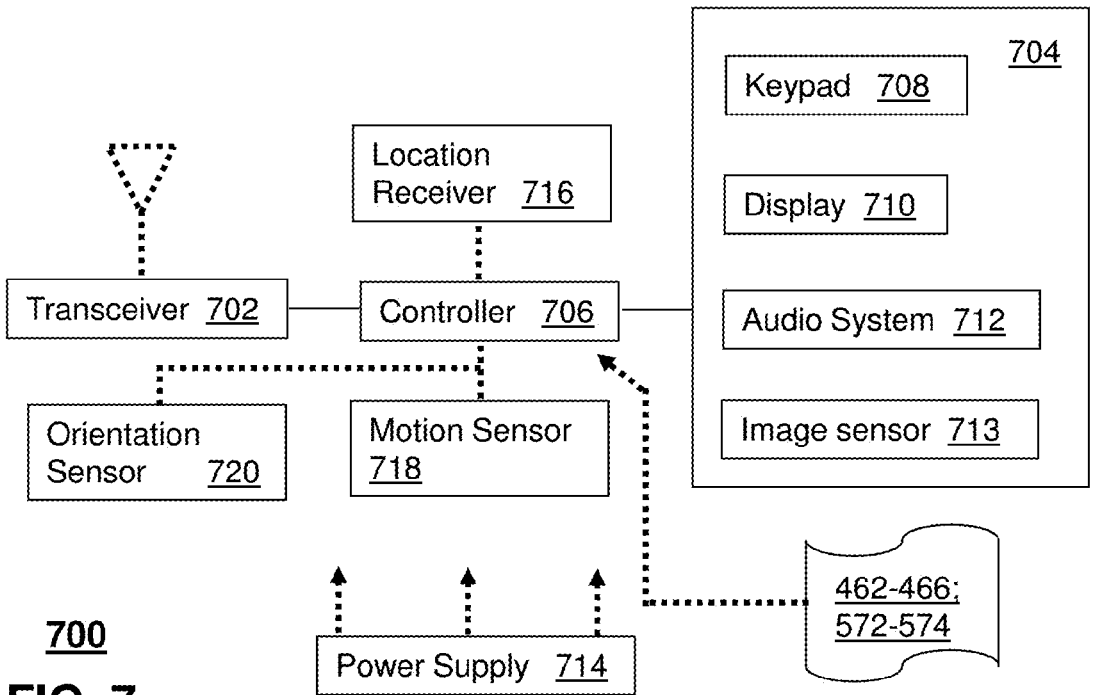
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIG. 1 and FIGS. 4-5. Communication device 700 in whole or in part can represent any of the communication devices described in FIGS. 1 and 4-5 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication system 400.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIG. 1, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in the system of FIG. 1, and the communication systems 400-500 of FIGS. 4-5, such as a gaming console and a media player.

The communication device 700 shown in FIG. 7 or portions thereof can serve as a representation of one or more of the devices of system 100 of FIG. 1, communication system 400, and communication system 500. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, the description server 130 can extract all image information possible from media content, including sound, spoken words, closed-captioning text, and embedded text. The description server 130 can then filter the extracted information for specific types of features before generating narrative descriptions from the filtered, extracted information.

In one or more embodiments, the narrative description can include Internet hyperlinks, Internet or social media comments, and/or descriptions of the media content derived from secondary sources. In one or more embodiments, a media processor device 106, mobile device 116A, and/or computing device 116B can perform the functions of the description server 130. In one or more embodiments, media content received on a first channel of a communication system 400 of a content provider can be analyzed to determine narrative description information while a second channel is received and presented by a media processor device 106 or other user device 116A-B.

In one or more embodiments, the narrative description can be used as an input to an image synthesis program. Images and/or video can be synthesized from the narrative description information. In one embodiment, the synthesized images/video can be used to verify the accuracy of the narrative description.

In one or more embodiments, real time media content can be analyzed to determine real-time narrative description information. For example, a live event could be analyzed. In another example, a person who has visual difficulties could listen to a running narrative of a live event. In another embodiment, a user can wear a camera or camera-bearing goggles. Real-time analysis of video data from the camera can be used to generate narrative data that tells the wearing, such as a visually impaired wearer, what is going on.

In one or more embodiments, a comprehensive, low-level narrative can be generated that is based on a rich variety of extraction techniques. This comprehensive narrative can be filtered in many ways via applications that use the information. In one or more embodiments, differentiated narrative information can be generated by the description server 130. Each specific application drives the approach that is used by the description server 130 for generating the narrative description. For example, a specific application might require information about the presence or absence of sports cars in the media content. Therefore, the extraction only scans images for sports cars. This embodiment can be particularly advantageous where comprehensive narrative processing would require too much processing time, resources, and/or system bandwidth.

In one or more embodiments, the description server 130 can remember features that have been detected in an early scene and previously mentioned in the narrative. The description server 130 can avoid repeating these features in the description or can describe these features in a shorthand form, to thereby eliminate redundancy and/or to reduce storage needs. For example, the narrative can determine that the media content shows a football game between one team in green jerseys and one team in red jerseys. The description server 130 can further determine that the green team is the Jets while the red team is the Chiefs. In later portions of the narrative description, the team name is substituted as a short hand term. As another example, if the narrative describes the weather condition as raining, then this features is not mention again unless the weather changes.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/ or wired paths that utilize one or more of various protocols or methodologies, where the coupling and/or connection can be direct (e.g., no intervening processing device) and/or indirect (e.g., an intermediary processing device such as a router).

Figure 8:
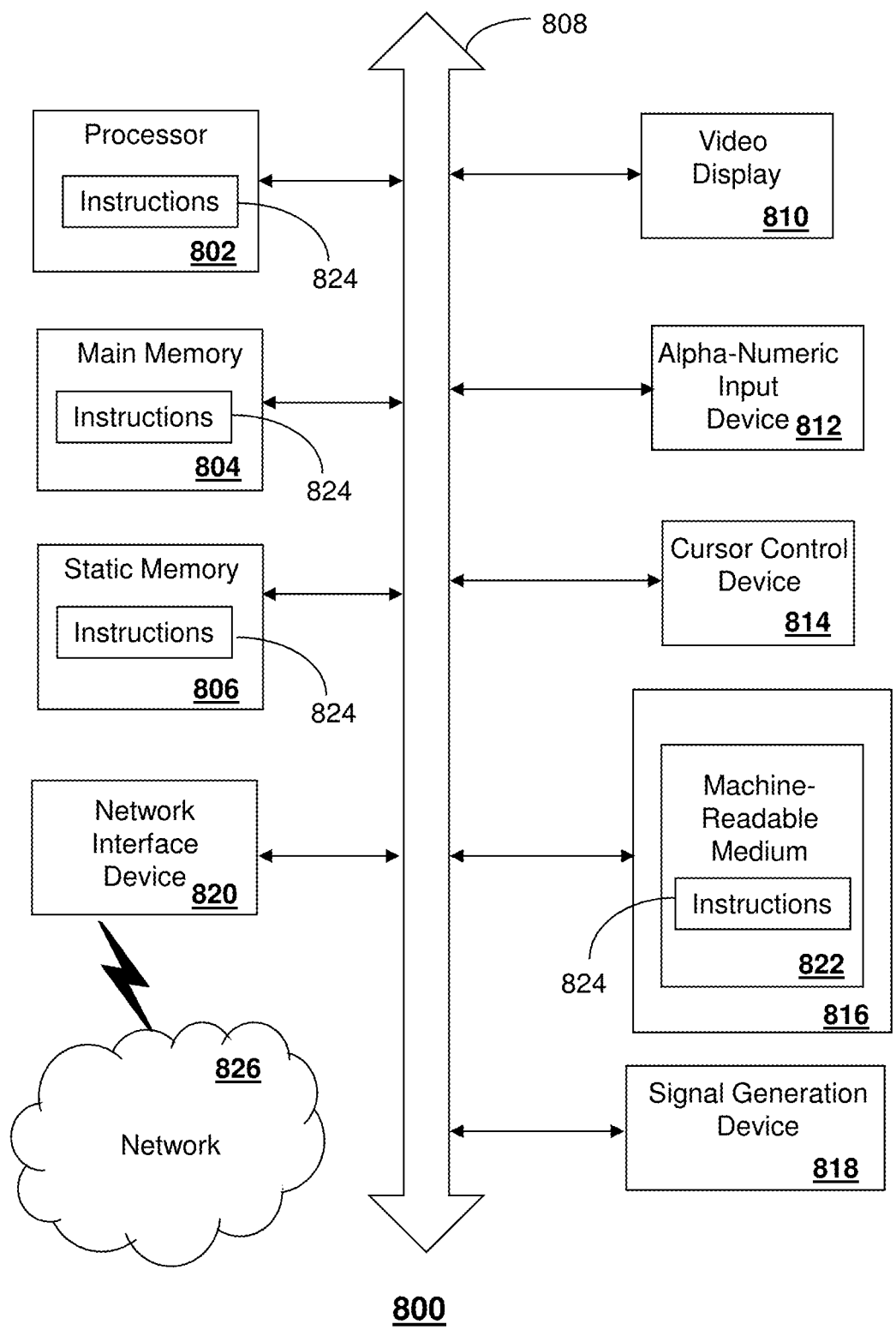
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the description server 430, the media processor 406, the description storage device 160, the mobile communication device 116A, and the computing device 116B of FIGS. 1-5. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium, comprising executable instructions that, when executed by a processing system including a processor, facilitate performance of operations, comprising:
    determining visual capabilities of a user viewing a media content item at a device;
    filtering a plurality of narrative descriptions associated with the media content item according to the visual capabilities of the user viewing the media content item to generate a plurality of filtered descriptions;
    determining if a feature in the plurality of narrative descriptions has been provided in a first portion of the filtered description; and
    replacing a non-shortened description of the feature with a shortened description of the feature in a second portion of the filtered description responsive to determining that the feature has been provided in the first portion, wherein the shortened description occupies a smaller memory space than the non-shortened description of the feature provided in the first portion of the filtered description; and
    transmitting the media content item, the first portion of the plurality of filtered descriptions, and the second portion of the plurality of filtered descriptions to the device for presentation via an application.

2. The non-transitory machine-readable storage medium of claim 1, wherein the narrative description is further filtered according to requirements of the application.

3. The non-transitory machine-readable storage medium of claim 1, wherein the plurality of narrative descriptions are associated with a plurality of time stamps of the media content item.

4. The non-transitory machine-readable storage medium of claim 1, wherein the operations further comprise:
    scanning a plurality of images from the media content item to detect a plurality of visual features present within the plurality of images;
    analyzing interactions between the plurality of visual features to determine a plurality of visual events that are depicted in the media content item; and
    generating the plurality of narrative descriptions corresponding to the plurality of visual features and the plurality of visual events.

5. The non-transitory machine-readable storage medium of claim 4, wherein the filtered descriptions comprise emotional states in the media content item, and wherein the operations further comprise:

recognizing facial expressions of persons in the visual features in the media content item; and determining the emotional states in the media content according to the facial expressions that are recognized.

6. The non-transitory machine-readable storage medium of claim 4, wherein the operations further comprise filtering the plurality of visual features according to second requirements of the application.

7. The non-transitory machine-readable storage medium of claim 4, wherein the plurality of narrative descriptions comprise natural language descriptions of the plurality of visual features and the plurality of visual events.

8. The non-transitory machine-readable storage medium of claim 4, wherein the operations further comprise analyzing audio content of the media content item to extract audio information associated with the plurality of visual features, wherein the step of analyzing interactions further includes the audio information.

9. The non-transitory machine-readable storage medium of claim 4, wherein the operations further comprise analyzing lighting characteristics of the plurality of visual features to extract mood information, wherein the step of analyzing interactions further includes the mood information.

10. The non-transitory machine-readable storage medium of claim 1, wherein the operations further comprise:

searching the plurality of filtered descriptions based on a search term;

selecting a video clip from the media content item, wherein a filtered description of the plurality of filtered descriptions substantially matches the search term;

generating a speech rendering corresponding to the filtered descriptions; and presenting the video clip and the speech rendering via the application.

11. The non-transitory machine-readable storage medium of claim 1, wherein the filtering of the narrative descriptions according to second requirements of a profile of user associated with the application.

12. The non-transitory machine-readable storage medium of claim 1, wherein the operations further comprise:

comparing the plurality of narrative descriptions to a plurality of objectionable event descriptions; and censoring a portion of the media content item corresponding to a narrative description of the plurality of narrative descriptions that substantially matches an objectionable event description of the plurality of objectionable event descriptions.

13. The non-transitory machine-readable storage medium of claim 12, wherein the censoring comprises removing the portion of the media content item.

14. The non-transitory machine-readable storage medium of claim 12, wherein the censoring comprises generating an advisory of the objectionable event.

15. A communication device, comprising:

a processing system including a processor; and a memory that stores executable instructions that, when executed by the processing system, facilitate performance of operations, comprising:

providing, to a server, visual capabilities of a user viewing a media content item;

receiving, from the server, the media content item, a first portion of a plurality of filtered descriptions associated with the media content item, and a second portion of the plurality of filtered descriptions associated with the media content item, a wherein the filter descriptions are generated from a plurality of narrative descriptions associated with the media content according to the visual capabilities of the user of the media content item, and wherein the first portion includes a non-shortened description of a feature and the second portion includes a shortened description of the feature that occupies a smaller memory space than the non-shortened description; and presenting the media content item, the first portion of the plurality of filtered descriptions associated with the media content item, and the second portion of the plurality of filtered descriptions associated with the media content item via an application.

16. The communication device of claim 15, wherein the operations further comprise:

receiving a portion of the media content item from the server, wherein the portion is extracted from the media content item corresponding to a narrative description of the plurality of narrative descriptions that substantially matches a target event description of a plurality of target event descriptions; and presenting the portion of the media content item via the application.

17. The communication device of claim 15, wherein the operations further comprise receiving a graphical representation of a portion of the plurality of narrative descriptions.

18. The communication device of claim 15, wherein the narrative description is further filtered according to requirements of the application.

19. The communication device of claim 15, wherein the plurality of narrative descriptions are associated with a plurality of time stamps of the media content item.

20. A method, comprising:

providing, by a processing system including a processor, to a server, visual capabilities of a user viewing a media content item;

receiving, by the processing system, from the server, the media content item, a first portion of a plurality of filtered descriptions associated with the media content item, and a second portion of the plurality of filtered descriptions associated with the media content item, a wherein the filter descriptions are generated from a plurality of narrative descriptions associated with the media content according to the visual capabilities of the user of the media content item, and wherein the first portion includes a non-shortened description of a feature and the second portion includes a shortened description of the feature that occupies a smaller memory space than the non-shortened description; and presenting, by the processing system, the media content item, the first portion of the plurality of filtered descriptions associated with the media content item, and the second portion of the plurality of filtered descriptions associated with the media content item via an application.

* * * * *